Sept. 15, 1936.  J. D. COCHIN  2,054,555
PORTABLE VEHICLE LIFT
Filed June 13, 1932  2 Sheets-Sheet 1
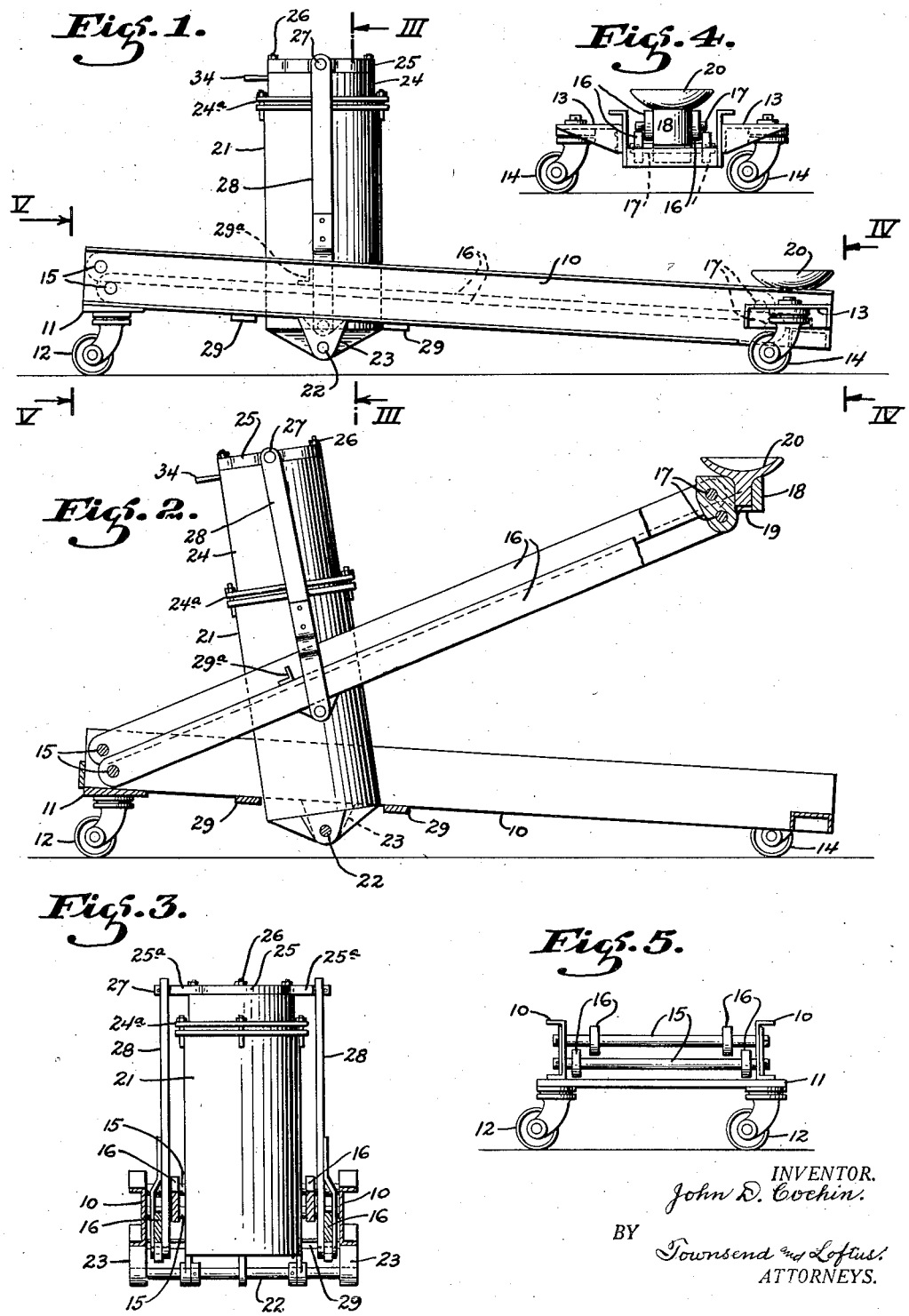
INVENTOR.
John D. Cochin.
BY Townsend and Loftus
ATTORNEYS.

Sept. 15, 1936.  J. D. COCHIN  2,054,555
PORTABLE VEHICLE LIFT
Filed June 13, 1932   2 Sheets-Sheet 2
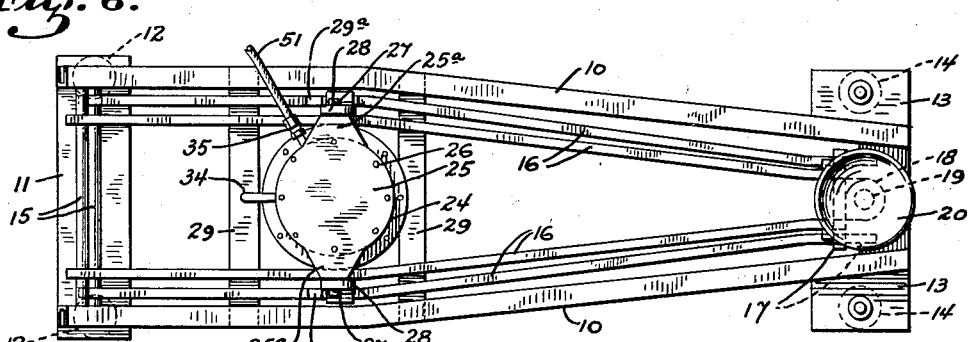
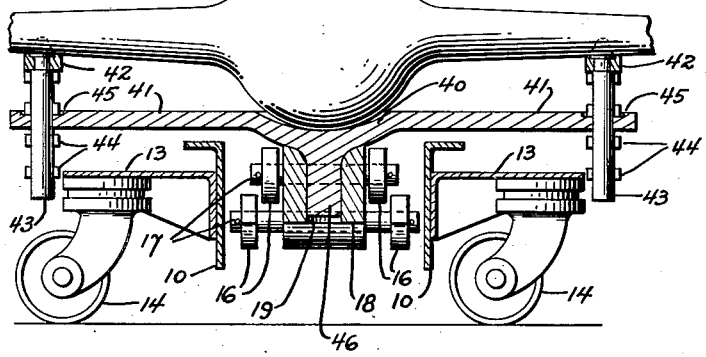
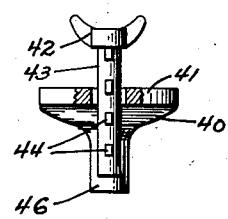
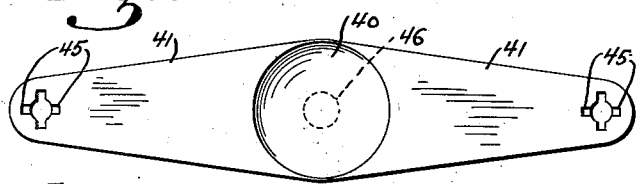
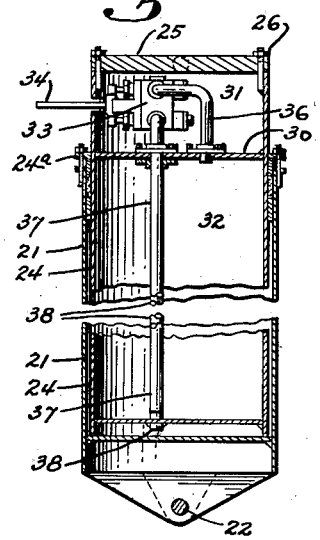
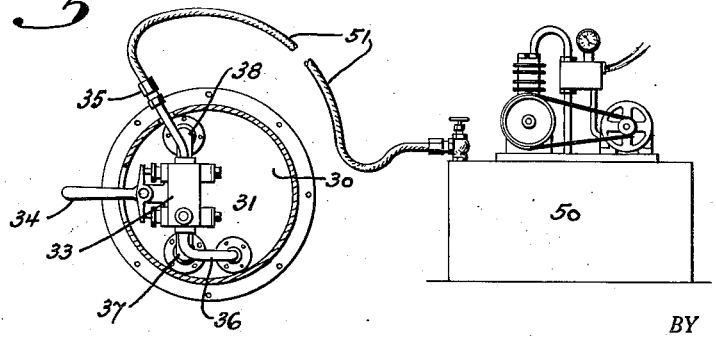
INVENTOR.
John D. Cochin.
BY
Townsend & Loftus.
ATTORNEYS.

Patented Sept. 15, 1936

2,054,555

UNITED STATES PATENT OFFICE 2,054,555

PORTABLE VEHICLE LIFT

John D. Cochin, San Francisco, Calif.

Application June 13, 1932, Serial No. 616,821

3 Claims. (Cl. 254—2)

This invention relates to vehicle lifts, and more particularly, to a vehicle lift of the portable type that is actuated by fluid under pressure.

In general, vehicle lifts are of two classes, namely, power actuated lifts that are stationarily secured to the floor or ground and adapted to raise an entire vehicle, and smaller hand actuated lifts movable from place to place on wheels or casters and adapted to raise one end of a vehicle.

The first type of lift is limited in its use as the vehicle must be driven over it before being lifted and must remain on the lift while mechanics are at work on it so that the lift is not available for other vehicles. The second type of lift may be used to raise one end of a vehicle so that supports may be placed under it and the lift may be rolled from place to place to be used on any number of vehicles while the other vehicles rest on supports in their raised position. This latter type of lift is generally not large enough to raise a vehicle to an appreciable height and, if made large enough to do so, it is not efficient as it must be operated by man power and the time required for a man to raise a vehicle more than a few inches makes such devices impractical.

It is the object of the present invention to provide a portable vehicle lift that is relatively small and light in weight so that it may be conveniently moved about a shop or garage, and that is actuated by fluid under pressure so that it will have sufficient power to raise a motor vehicle at a rapid rate and to a considerable height. Further objects of the invention, as well as many advantages presented by the novel structure of which it consists, will become apparent from an understanding of the following specification in which reference is made to the accompanying drawings.

In these drawings—

Fig. 1 is a side elevation of a portable vehicle lift embodying my invention.

Fig. 2 is a view similar to Fig. 1 with parts shown in section and showing the lift in its raised position.

Fig. 3 is a sectional view taken on the line III—III of Fig. 1.

Fig. 4 is an end elevation of the vehicle lift taken in the direction of arrows IV—IV in Fig. 1.

Fig. 5 is an end elevation taken in the direction of the arrows V—V of Fig. 1.

Fig. 6 is a plan view of the vehicle lift.

Fig. 7 is a central, vertical section of a vehicle engaging member which forms a part of my invention.

Fig. 8 is an end view of the vehicle engaging member shown in Fig. 7.

Fig. 9 is a plan view of the same.

Fig. 10 is a central, vertical section of the lifting ram employed in the vehicle lift, and Fig. 11 is a plan view of the same with the top plate removed to show the position of the control valve.

Referring more particularly to the drawings, the vehicle lift is seen to comprise a generally horizontal body member, which consists of a pair of spaced channel irons 10. The channel irons 10 are supported at their rear end by means of a cross member 11 which rests upon a pair of casters 12. At their forward ends the channel irons are bent toward each other and are supported by a pair of brackets 13 suitably secured to their sides and resting upon casters 14. By bending the channel irons 10 toward each other and fitting them with the brackets 13, the forward end of the lift has been made as narrow and as low as possible so that it may be conveniently rolled into small places and under low objects for lifting them. The channel iron frame with its casters, as described, provides what may be termed a truck or dolly by means of which the lifting mechanism may be moved from place to place.

The rear ends of the channels 10 support a pair of spaced cross bars 15, which cross bars pivotally carry two pairs of parallel lifting arms 16. The forward ends of the lifting arms 16 are connected by means of bars 17 which support a block 18. The block 18 is centrally and vertically bored, as at 19, to receive a vehicle engaging member 20, which member will be more fully described hereinafter.

From the description so far, it is apparent that in the normal position of the device the parallel lifting arms 16 lie within the space between the channel irons 10 and support the vehicle engaging member in its lowermost position, as illustrated in Fig. 1. When an upward force is applied to pivot the lifting arms 16 about their connections with the cross bars 15, their free ends will swing upwardly so as to carry the block 18 and vehicle engaging member 20 to a raised position, as illustrated in Fig. 2. Due to the fact that the bars 15 are spaced equal distances from the bars 17 and that the lifting arms 16 are arranged in parallel pairs, the upward movement of the lifting arms is accompanied by a slight rotation of the block 18 with respect to its support, with the result that this block is always maintained in a substantially horizontal position. In order to raise the lifting arms 16 a hydraulic ram is provided. This ram consists of a cylinder 21 pivotally supported on a shaft 22, which shaft is mounted in a pair of brackets 23 extending downwardly from the lower surface of the channel irons 10. A piston 24 is reciprocally mounted in the cylinder 21 and a fluid tight packing ring 24a is fixed to the cylinder in the usual manner. The piston 24 is provided with a head member 25 secured thereto by means of bolts 26 welded or otherwise fastened to the interior of the piston and extending upwardly through the head. This head 25 is provided at its opposite sides with outwardly extending projections 25a, each of which terminates in a trunnion 27. A link 28 is carried by each of the trunnions 27 and is pivoted at its lower end to the lowermost of the parallel links 16. It should be noted that the three points of connection between the ram, the main frame and the lifting arms are all pivotal so that during lifting movement the ram is free to assume the angle of greatest efficiency with respect to the load that it is lifting. Bars 29 extending between the lower edges of the channels 10 and lugs 29a welded to arms 16 prevent tilting of the piston under normal conditions.

The manner in which the piston is raised is best shown in Figs. 10 and 11. The interior of the piston is provided with a partition 30 which divides it into an upper compartment or valve chamber 31 and a lower compartment or oil reservoir 32. A valve 33 positioned in the valve chamber 31 is of the type shown in my Patent Number 1,764,004, entitled Valves for lifting devices. It is not necessary to describe this valve in detail here any more than to say that it is capable, upon actuation of a single lever 34, to control simultaneously the flow of two separate fluids, preferably oil and air. The oil reservoir 32 is normally substantially filled with oil or any other suitable non-compressible fluid and a source of air under pressure, such as illustrated at 50 in Fig. 11 and which preferably consists of some conventional type of air compressor, is connected with the valve 33 by means of a connection 35 and a small flexible hose 51 that will permit movement of the vehicle lift about the garage or shop. An air conduit 36 connects the valve 33 with the interior of the oil reservoir 32 and an oil conduit 37 connects the valve with the interior of the same reservoir. A second oil conduit 38 extends through the reservoir 32 and opens into the cylinder 21 at a point beneath the piston 24. In operation the valve lever 34 is moved in one direction to open an air valve and an oil valve in the main valve 33. This permits air under pressure to enter through the conduit 36 into the reservoir 32 and the pressure of the air therein forces oil outwardly through the conduit 37 through the open oil valve and back through the conduit 38 into the space beneath the piston. This oil raises the piston in the cylinder until it assumes the position shown in Fig. 2. At that time, or at any time prior thereto, when the vehicle has been raised to a desired height, the valve lever 34 may be released and will return to its normal position, closing both the air valve and the oil valve, with the result that the oil is locked in the cylinder beneath the piston and the vehicle is supported in its raised position by incompressible fluid. When it is desired to lower the vehicle the valve lever 34 is moved in the opposite direction, which movement opens an air exhaust port and an oil valve within the main valve 33. The air within the piston 32 is then exhausted and the weight of the vehicle, tending to move the piston downwardly, forces the oil back through conduit 38, the open oil valve, and the conduit 37 to its original position within the reservoir 32 in the piston. This action takes place very quickly and in actual practice a large truck having a load capacity of two tons or more may be tilted upwardly, when the lift is placed beneath either its front axle or rear axle, to a height of about four feet in less than ten seconds.

Referring again to the vehicle engaging member 20, shown in Figs. 1 and 2, this member consists of a dish-shaped element which will conveniently engage either the front or rear axle of a vehicle. It has been found in raising heavy vehicles, that due to the fact that they are supported only at a single point, they are more or less unstable when in a raised position and, for this reason, I have provided a preferred form of vehicle engaging member for use in connection with this lift, as shown in Figs. 7, 8, and 9. This member comprises a central dish-shaped portion 40 similar to that shown in Figs. 1 and 2, but having a pair of outwardly extending arms 41. In raising the rear end of a vehicle the dish-shaped member 40 serves to engage the differential housing, as illustrated in Fig. 7. The outer ends of the arms 41 carry U-shaped brackets 42 for engaging the axle housing at opposite sides of the differential to form a better support for the vehicle and give it stability in its elevated position. The U-shaped brackets 42 are carried by vertical pins 43 which are provided with spaced lugs 44 as shown. The outer ends of the arms 41 are provided with slotted holes shaped to slidably receive the pins 43 with their lugs 44 when they are turned in one direction and to prevent sliding of the same when they are rotated through an arc of 45°, the lugs disposed on top of the arms 41 preventing the pins from sliding downwardly. Elongated recesses 45 may be provided adjacent the edges of the holes in the arms 41 so as to receive the lugs 44 and prevent accidental rotation thereof.

With this structure it is possible to adjust the height of the U-shaped supporting members 42 so that they will properly engage the axles of vehicles having differential housings of different sizes and shapes. In raising a vehicle by the front axle the U-shaped members 42 serve to engage the axle at spaced points thereby also rigidly holding the vehicle in its raised position. It should also be noted that the downwardly extending projection or pin 46 and the central bore 19 in the block 18 into which this pin fits are flared at their upper ends so that lateral strain is not likely to cause breakage of the pin.

The pin 46 is free to turn in the bore 19 so that the vehicle engaging member will swivel upon the lift. Through this construction the vehicle to be raised may be approached with the lift at any angle. This is a decided advantage over the ordinary lift with which it is necessary to approach the vehicle parallel to its length and in line with its center.

From the foregoing it is apparent that I have provided a portable vehicle lift which is relatively small and light in weight so that it may be conveniently rolled from place to place in a garage and which, at the same time, is sufficiently rugged in structure, possessing ample power to raise heavy types of vehicles quickly and efficiently.

While I have shown a preferred form of my invention and described the same in more or less specific terms, it should be understood that various changes may be resorted to in the arrangement and construction of its several parts within the spirit and scope of the appended claims.

Having thus described my invention, what I claim and desire to secure by Letters Patent is:

1. A vehicle lift which comprises a main frame, casters disposed beneath and supporting one end of said frame, brackets secured to the opposite end of the frame between the top and bottom thereof, and casters carried by said brackets and supporting that end of the frame whereby one end of the frame will be lower than the other, lifting arms pivoted to the higher end of the frame, a vehicle engaging member carried by said arms at the lower end of the frame and means for raising said arms about their pivotal connection with the frame.

2. In combination with a vehicle lift of the character described, a vehicle engaging member, a pair of arms extending outwardly therefrom in opposite directions and provided with vertically extending slotted openings, a pin in each of said openings, spaced lugs on said pins whereby the pins are vertically adjustable when turned so that said lugs register with the slots of said openings and may be locked in adjusted position by turning the lugs out of registry with said slots, and means on the tops of the pins for engaging the vehicle.

3. In a vehicle lift of the character described including a lifting arm and a vehicle engaging member carried by said arm, a pair of arms extending outwardly from said vehicle engaging member, and vertically adjustable means at the outer ends of said arms to engage the vehicle at points spaced from the vehicle engaging member to steady the vehicle against rocking movement.

JOHN D. COCHIN.